UNITED STATES PATENT OFFICE 2,058,984

CEMENTITIOUS MATERIAL

Dean S. Hubbell, Pittsburgh, Pa., assignor to H. H. Robertson Company, Pittsburgh, Pa., a corporation of Pennsylvania No Drawing. Application October 12, 1934, Serial No. 748,114

4 Claims. (Cl. 106—29)

This invention relates to cements of that type which have been or are now commonly used in the building or other industrial arts and which contain a constituent or ingredient which is more or less soluble in water. The present invention has for one of its objects to improve the life and strength of cements of this type. The invention also has for its object to improve cements of the Sorel type particularly the magnesium oxychloride cements, which formerly were largely used in the building or industrial arts but the use of which is now materially less, owing to the solubility in water of portions of this type of cement. The invention further has for its object to provide cements of the Sorel type and particularly magnesium oxychloride cement, whose solubility in water is materially reduced, whose strength is materially increased, whose setting time is materially extended, and which has imparted to it a desirable green color. The invention still further has for its object to produce the improved cements in a novel manner and at a minimum cost as will be described.

In accordance with this invention, the highly desirable results above specified are obtained by incorporating in the cement a material or materials which reacts with the soluble material or constituent of the cement to produce in the cement a body of constituent which is substantially insoluble in water.

A material or materials suitable for the production of the insoluble body or constituent is copper, which may be incorporated in the cement in metallic form, preferably in the form of a powder.

It is preferred to employ metallic copper in a finely divided or powdered condition, such as may be produced by hammer mills or by electrolytic means of precipitation, which latter method produces a powder whose particles may have an average diameter of eight microns or 0.008 millimeter or 0.000315 inch.

Magnesia cements have a large potential field. They were once the basis for a large industry and could become even more important again if their water resistance could be increased to the point where they were better suited for stucco, floor coverings, tiles, molded or other preformed articles, etc.

These cements have been disqualified for many of their uses because of the extent to which their cementing constituent dissolves in water, forming a dilute solution of magnesium chloride. If this magnesium chloride is not removed as rapidly as it is formed it accelerates the disintegration of the cement due to the even greater solubility in it than in water of magnesium oxychloride. In accordance with this invention, the water-proofing of these cements has been accomplished first by causing to be formed in and through the cement a highly insoluble component which, by filling pores and interstices and enveloping the more soluble magnesium oxychloride, protects it from water, and second by having present in the cement a material which will react with the magnesium chloride as it is leached from the magnesium oxychloride, precipitating it as insoluble void-filling material before it can contribute to the further solution of the cement.

As stated above, copper is employed in this invention to produce the protecting component. The results differ in some details depending upon the form of copper employed and the method of its incorporation as will be described.

It has been found that the hydroxide and basic chlorides of copper are extremely insoluble and have a bluish green color.

If, as is preferred, metallic copper is added to the cement mixture in the form of a fine powder, the copper particles, which due to their minute size have a high ratio of surface to volume, react with their environment to form insoluble copper compounds, most probably the mineral atacamite but possibly as intermediate compounds a less stable oxychloride or the hydroxide. This reaction product occupies more space than the original copper particle and as it forms it swells to effectively plug up the capillaries and the interstices of the cement with an insoluble material.

Theoretically, if the copper particle corroded completely the reaction products would occupy about 13½ times the space required by the original particle.

It will be seen that if this swelling took place too soon the cement would be expanded and its structure opened to disintegration. Copper has been found to possess the necessary characteristic of waiting until after the structure of the host cement has been formed and has become strong before the copper is corroded appreciably.

It will be understood that the reaction of the copper with its environment does not proceed to completion at once and it is probable that metallic copper will remain in the centers of the larger particles for years, and will serve as reserves held in readiness to combine with any magnesium chloride that results from solution of the cement during exposure.

The use of copper also produces in the cement a very pleasing color, namely, the blue-green characteristics of corroded copper and it materially reduces the problem of efflorescence so prevalent with magnesium oxychloride cements, especially, where high humidities are encountered. This efflorescence is probably due to the travel of excess magnesium chloride to the surface of the cement where it is changed to the insoluble white hydroxide.

The role of the copper and especially in the powdered form is probably of combining with this excess magnesium chloride or of preventing its change to the hydroxide.

The proportions shown below are presented as typical cement mixtures embodying the copper additions specified but it is desired that they shall not be construed as limiting proportions or concentrations in any respect. All percentages are given by weight.

A normal mixture for magnesium oxychloride cement consists of a dry mixture and a gaging solution. The dry mixture contains 20% plastic (or caustic) magnesia, and 80% aggregate, preferably silica, and consisting of an even grading of particles from 48 mesh down. Color pigment may be used as desired. The gaging solution consists of magnesium chloride solution of 22 degrees Baumé and is mixed with the dry mixture in sufficient amount to produce a satisfactory consistency, usually 0.28 c. c. per gram dry mixture.

When, as is preferred, the copper is added in the finely divided metallic form to the dry mix of the cement it has been demonstrated that the increase in the tensile strength of the cement and the decrease in its solubility in water is greater as the amount of copper is increased. Excellent results have been obtained by the use of from 5% to 6% by weight of powdered copper but it is not desired to limit the invention to these amounts.

By the term "substantially insoluble" as used in the specification and claims, it is desired to be understood as meaning a body which, as compared with limestone or marble, is insoluble for all practical purposes although it may be slightly soluble with difficulty.

What is claimed is:

1. A cementitious material possessing improved weather resistance comprising a cement of the Sorel type containing finely divided copper in an amount substantially less than the amount of the cement.

2. A cementitious material possessing improved weather resistance comprising a magnesium oxychloride cement containing finely divided copper in an amount substantially less than the amount of the cement.

3. A cementitious product possessing improved weather resistance comprising a major proportion of a cement of the Sorel type containing an aggregate forming voids between the particles thereof and a minor proportion of finely divided copper, and a bluish-green insoluble copper compound being disposed in said voids.

4. A cementitious product possessing improved weather resistance comprising a major proportion of a magnesium oxychloride cement containing an aggregate forming voids between the particles thereof and a minor proportion of finely divided copper, and a bluish-green insoluble copper compound being disposed in said voids.

DEAN S. HUBBELL.